(12) United States Patent
Goetti

(10) Patent No.: US 10,585,297 B2
(45) Date of Patent: Mar. 10, 2020

(54) FASTENING OF A STRUCTURAL PART TO AN OPHTHALMIC LENS

(71) Applicant: goetti SWITZERLAND GmbH, Waedenswil (CH)

(72) Inventor: Sven Goetti, Zurich (CH)

(73) Assignee: GOETTI SWITZERLAND GMBH, Waedenswil (CH)

( * ) Notice: Subject to any disclaimer, the term of this patent is extended or adjusted under 35 U.S.C. 154(b) by 131 days.

(21) Appl. No.: 15/342,219

(22) Filed: Nov. 3, 2016

(65) Prior Publication Data

US 2017/0160560 A1    Jun. 8, 2017

(30) Foreign Application Priority Data

Dec. 3, 2015   (CH) .................................. 1764/15
May 13, 2016  (EP) .................................. 16169653

(51) Int. Cl.
G02C 1/02      (2006.01)
G02C 13/00     (2006.01)

(52) U.S. Cl.
CPC ............. G02C 1/02 (2013.01); G02C 13/001 (2013.01); *G02C 2200/20* (2013.01); *G02C 2200/32* (2013.01)

(58) Field of Classification Search
CPC .... G02C 1/02; G02C 13/001; G02C 2200/20; G02C 2200/32; G02C 5/02; G02C 5/14
USPC .................................. 351/103, 106, 110, 140
See application file for complete search history.

(56) References Cited

U.S. PATENT DOCUMENTS

| | | | | |
|---|---|---|---|---|
| 6,007,200 A  * | 12/1999 | Tachibana | ................ | G02C 1/02 351/110 |
| 6,024,445 A  * | 2/2000 | Conner | .................... | G02C 1/02 351/110 |
| 6,409,337 B1 | 6/2002 | Delamour et al. | | |
| 2003/0058402 A1* | 3/2003 | Conner | .................... | G02C 1/02 351/110 |
| 2005/0275793 A1 | 12/2005 | Yamaguchi et al. | | |
| 2009/0073378 A1* | 3/2009 | Tabacchi | ................. | G02C 1/02 351/141 |
| 2013/0128218 A1 | 5/2013 | Vignato | | |
| 2015/0316784 A1 | 11/2015 | He | | |

FOREIGN PATENT DOCUMENTS

| | | |
|---|---|---|
| CN | 2610357 Y | 4/2004 |
| EP | 0 546 589 A1 | 6/1993 |
| EP | 0 561 763 A1 | 9/1993 |
| EP | 1127289 B1 | 7/2005 |
| FR | 1069240 A | 7/1954 |
| FR | 2880138 A1 | 6/2006 |
| JP | 2000-89169 A | 3/2000 |
| WO | WO 03/083553 A2 | 10/2003 |

* cited by examiner

*Primary Examiner* — Darryl J Collins

(74) *Attorney, Agent, or Firm* — Birch, Stewart, Kolasch & Birch, LLP

(57) ABSTRACT

An ophthalmic lens fastening consists of a structural part and a sleeve. The sleeve is slidable into an elongated hole of an ophthalmic lens, and one end of the structural part is slidable into the sleeve such that a latching connection with a press fit is formed.

5 Claims, 3 Drawing Sheets

FASTENING OF A STRUCTURAL PART TO AN OPHTHALMIC LENS

TECHNICAL SCOPE

The application relates to a fastening of a structural part to an ophthalmic lens.

PRIOR ART

Lenses and frames of spectacles are usually connected together by means of screws, screw sleeves and nuts. Anti-rotation protection is achieved in the majority of cases by fastening in two bores or by means of pins and notches on the lens rim. The disadvantage of ophthalmic lens fastenings with a screw connection is that in the case of overtightening, strong intermittent tension is created in the ophthalmic lens, as a result of which there is a strong risk of fracture. If the connection is too loose, the spectacle frame is not dimensionally stable, as a result of which the seat fit and the visual comfort are impaired. A screw connection is permanently stressed when it is in daily use. As a result of said friction, the screw can come undone independently and even fall out.

A method described in EP 0 546 589 A1 (P. J. Lindberg) provides for the insertion of wire, which is bent in a U-shaped manner, into elongated holes in the lens. In this connection, the end of the wire is bent such that the two legs of the U-shape exert tension outward onto the edges of the elongated hole. In the case of said method, however, frequently so much tension is exerted onto the lens that the risk of fracturing the same increases massively.

EP 0 561 763 A1 (Silhouette International Ges.m.b.H) describes a solution for fastening metal structural parts to an ophthalmic lens without screws. In this connection, two protruding parallel fastening pins, which are provided with annular beads that are barb-like in cross section and are held in two bores close to the edge of the ophthalmic lens, are soldered-on or welded-on an end web which engages over the lens rim. Plastic sleeves are used for the purpose of fixing and equalizing tension between the ophthalmic lens and the structural part. In the case of said method, however, there is the risk that the plastic sleeves could be pulled out of the ophthalmic lens on the side situated opposite the structural part. A further development of said idea is described in WO 2003/083553 A2 (Silhouette International Schmied AG), according to which in each case two plastic sleeves comprise a head which engages over the bore edge and also serves as a connecting web.

In the case of all the methods described here, the structural part is in direct contact with the surface of the ophthalmic lens in order to stabilize the connection. As soon as the structural part consists of a material which is harder than the material of the ophthalmic lens, there is the risk that the ophthalmic lens could be damaged.

REPRESENTATION OF THE INVENTION

It is the object of the present invention to develop further an ophthalmic lens fastening for fastening a structural part to an ophthalmic lens to the effect that a connection is produced which is not able to undo itself or become loose during use.

The object is achieved by an ophthalmic lens fastening and by a method for fastening a structural part to an ophthalmic lens according to the claims.

The ophthalmic lens fastening consists of a structural part, e.g. a side piece, a bridge or a fastening element connected thereto, and a sleeve, the sleeve being slidable into an elongated hole of an ophthalmic lens and an end of the structural part being slidable into the sleeve such that a latching connection with a press fit is formed.

The ophthalmic lens is produced in such a manner or is machined after production to the effect that it comprises an elongated hole with expedient dimensions. Said elongated hole serves as receiving means for the sleeve and indirectly for the end of the structural part.

The sleeve is inserted into the elongated hole from the front face of the ophthalmic lens. The structural part is inserted into the sleeve from the rear face of the ophthalmic lens.

In a preferred manner, on one face the sleeve includes a stop head which is greater in dimension than the dimension of the elongated hole and consequently bears against the ophthalmic lens.

In a preferred manner, the structural part is prepared technically in such a manner that, when joined, the sleeve is deformed by the various characteristics of the materials. The barb-like bulges of the fastening pins are first of all hooked in the sleeve in this case and then a bead-like rim is formed.

The stop head of the sleeve serves as a barrier on the front face of the ophthalmic lens and the bead-like rim on the rear face of the ophthalmic lens. Said rims prevent the sleeve from being able to be pulled through the bore.

The advantage of such a fastening on an ophthalmic lens is that it is simple to assemble the matching components. As a result of the plug-in connection, which cannot undo itself independently, the connection is very durable and extremely low maintenance. A screw connection coming undone as a result of movement is dealt with in this way. As a result of the positive locking connection between the structural part and the sleeve as well as the specific geometry of the elongated hole, the tension, which the structural part outputs to the lens via the sleeve, is able to be distributed uniformly in all directions. In addition, the bead-like rim stabilizes the connection on the inside face, which has the advantage of the structural part not having any direct contact with the ophthalmic lens and thus prevents additional tension.

The plug-in connection is optimized for structural parts produced from a flat material. As the structural part is fastened to the ophthalmic lens from behind, the wearing position of the spectacles is the same for all thicknesses of ophthalmic lenses. In addition, the structural part is less prominent on the ready assembled spectacles as it does not have to be run about the lens from the front.

In a preferred manner, the structural part comprises parallel fastening pins with barb-like bulges.

The present invention is explained in more detail below by way of Figures and examples. The Figures are as follows.

WAYS TO EXECUTE THE INVENTION

Figure 1:
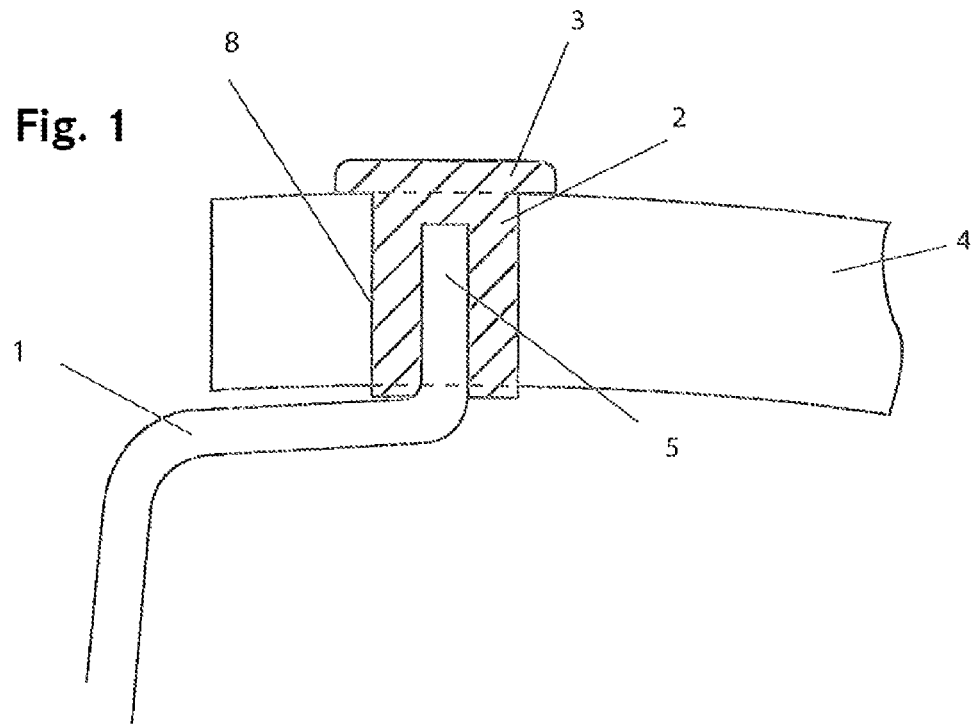
FIG. 1 shows the components of an ophthalmic lens fastening of the present invention in cross section in the mounted state.
Figure 2:
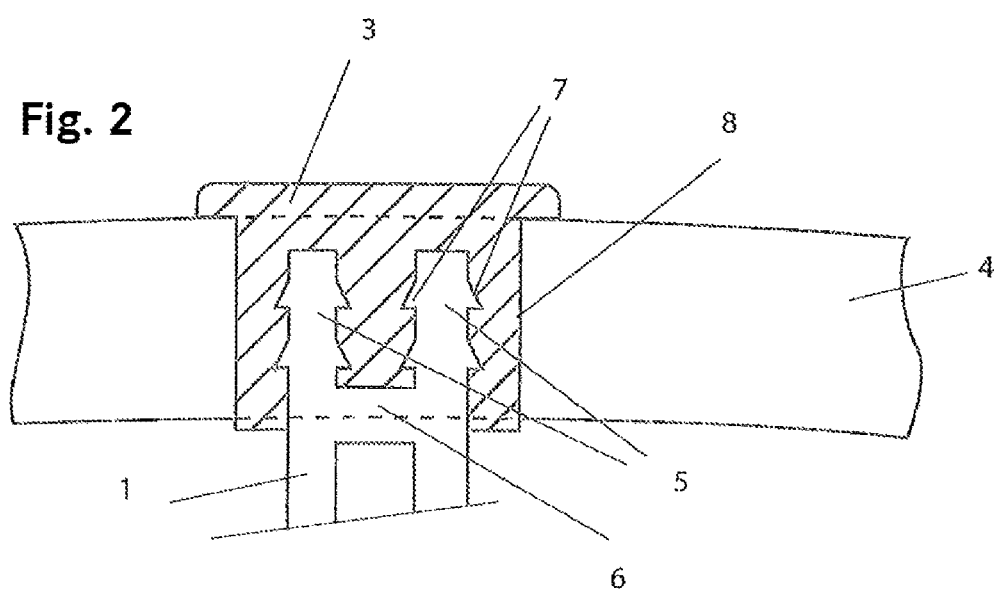
FIG. 2 shows the components of the ophthalmic lens fastening in longitudinal section in the mounted state.
Figure 3:
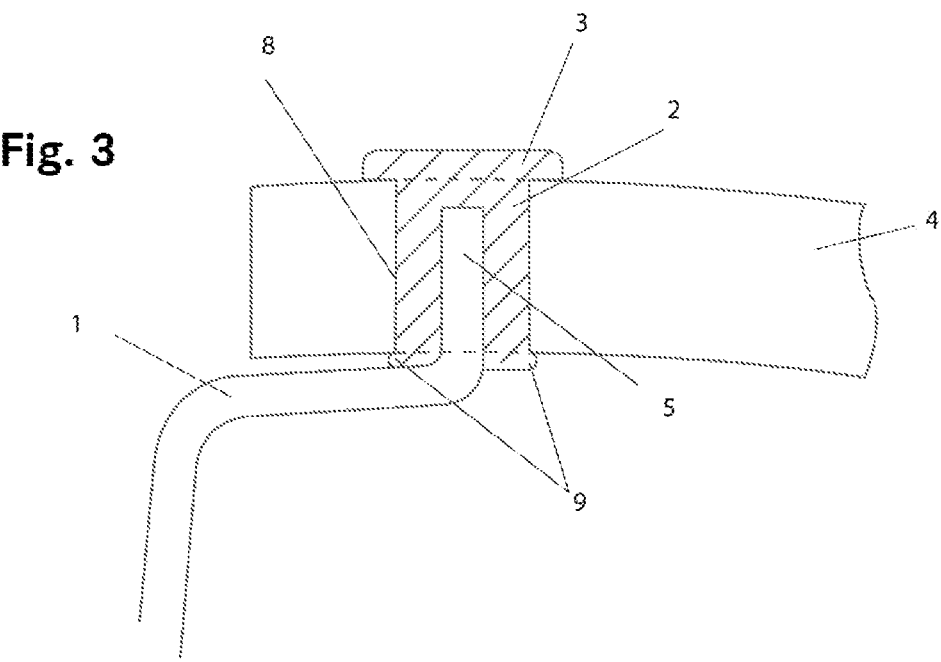
FIG. 3 shows the components of the ophthalmic lens fastening in cross section in the mounted state, with explicit representation of the bead-like rim.
Figure 4:
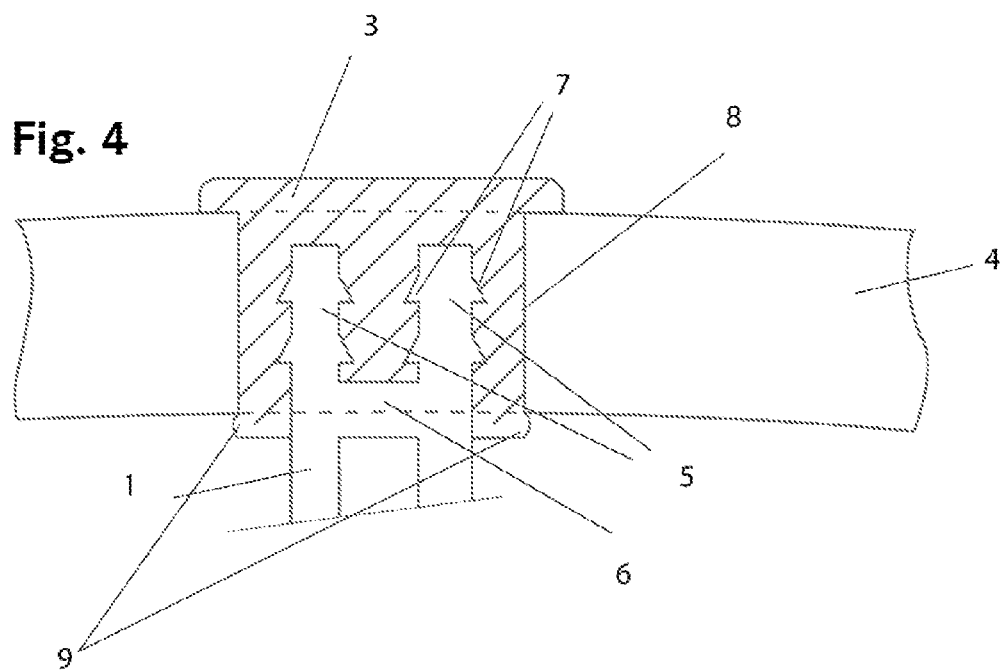
FIG. 4 shows the components of the ophthalmic lens fastening in longitudinal section in the mounted state, with explicit representation of the bead-like rim.

The ophthalmic lens fastening consists of a structural part 1 and a sleeve 2. Said two parts are wedged into one another in such a manner in an elongated hole 8 in the spectacle lens 4 that they form a latching connection with a press fit.

The end of the structural part 1 consists of parallel fastening pins 5 which are provided with barb-like bulges 7.

The sleeve 2 is inserted from the front face of the ophthalmic lens into the lens until the stop head 3 prevents any further insertion.

As a result of selecting the correct length or as a result of cutting the sleeve 2 to length, said sleeve remains somewhat longer than the ophthalmic lens 4 is thick at the position of the elongated hole 8.

The structural part 1 is prepared technically such that, in the inserted position, the fastening web 6 closes directly with the rear face of the sleeve 2.

As a result of the press fit between the structural part 1 and the sleeve 2 in the elongated hole 8 of the ophthalmic lens 4, the barb-like bulges 7 of the structural part 1 latch into the material of the sleeve 2.

The technical preparation of the barb-like bulges 7 enables only a pulling movement from the front face to the rear face of the ophthalmic lens 3. When pulled in the opposite direction, the barb-like bulges 7 of the structural part 1 are wedged in the sleeve 2.

The stop head 3 blocks the sleeve on the front face of the ophthalmic lens 4. As a result of the positive locking connection between the structural part 1, the sleeve 2 and the ophthalmic lens 4, the sleeve 2 is stretched, as a result of which a press fit is generated.

As a result of the material of the sleeve 2 being displaced by the fastening web 6, a bead-like rim 9, which creates advantageous fastening conditions, is generated in the case of the part of the sleeve which projects above the edge of the ophthalmic lens 4.

In the latched state, the structural part 1 and the sleeve 2 together form a connection which is inserted deeply in the elongated hole 8 of the ophthalmic lens 4.

Figure 5:
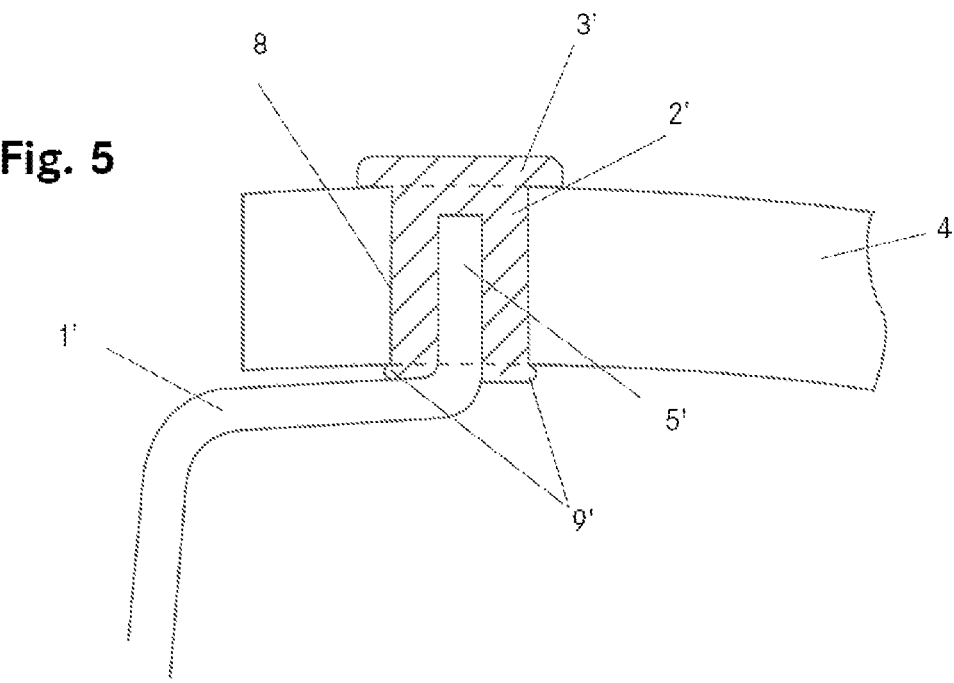
FIG. 5 shows the components of the ophthalmic lens fastening according to a second embodiment in cross section in the mounted state.
Figure 6:
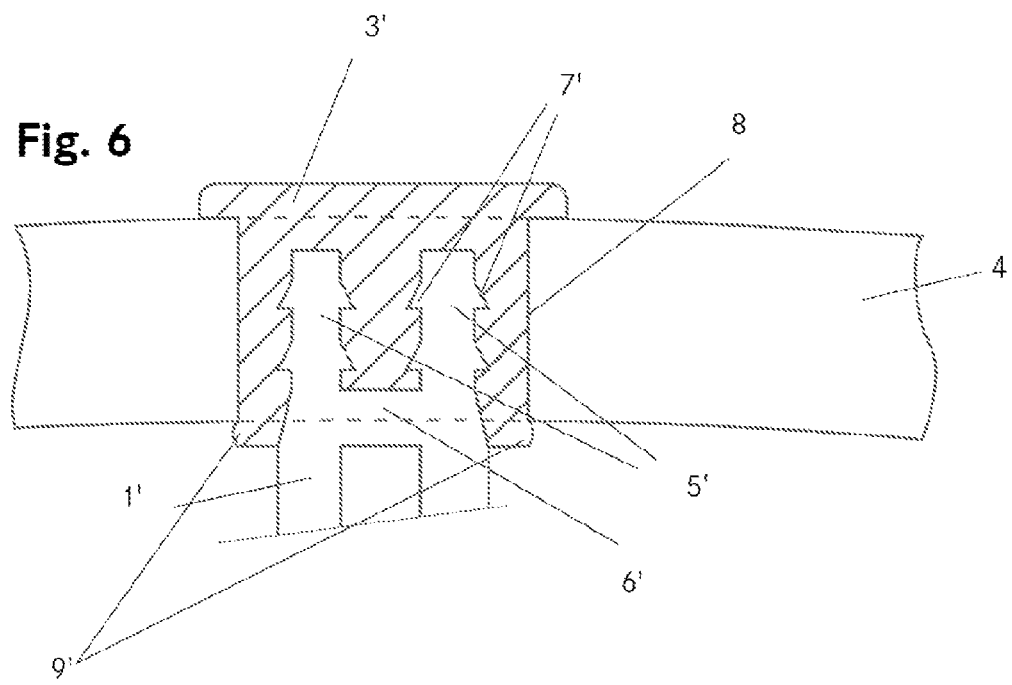
FIG. 6 shows the components of the ophthalmic lens fastening according to the second embodiment in longitudinal section in the mounted state.

FIGS. 5 and 6 show a second embodiment. This corresponds largely to the first embodiment according to FIGS. 1-4.

The ophthalmic lens fastening consists once again, therefore, of a structural part 1' and a sleeve 2'. Said two parts are wedged into one another in such a manner in an elongated hole 8 in the ophthalmic lens 4 that they form a latching connection with a press fit. The end of the structural part 1' consists of parallel fastening pins 5' which are provided with barb-like bulges 7'.

The sleeve 2' is inserted from the front face of the ophthalmic lens into the lens until the stop head 3' prevents any further insertion. As a result of selecting the correct length or as a result of cutting the sleeve 2' to length, said sleeve remains somewhat longer than the ophthalmic lens 4 is thick at the position of the elongated hole 8.

The structural part 1' is prepared technically such that, in the inserted position, the fastening web 6' closes directly with the rear face of the sleeve 2'.

As a result of the press fit between the structural part 1' and the sleeve 2' in the elongated hole 8 of the ophthalmic lens 4, the barb-like bulges 7' of the structural part 1' latch into the material of the sleeve 2' in the same way as in the case of the first embodiment.

As a result of the material of the sleeve 2' being displaced by the fastening web 6', a bead-like rim 9' is created in the case of the part of the sleeve which projects above the edge of the ophthalmic lens 4. This is then supported here by a widening of the fastening web 6' of the structural part 1'. The widening is produced from a width of the structural part 1' which tapers in the distal direction toward the parallel fastening pins 5'. In the mounted state, the tapering portion is situated in the region of the bead-like rim 9'. Realization of the bead-like rim 9' for the axial securement of the sleeve 2' on the ophthalmic lens 4 is possible with a wider selection of materials and geometries for the sleeve 2' on account of said modified geometry of the structural part 1'.

The invention claimed is:

1. An ophthalmic lens fastening, comprising:
   a structural part including parallel fastening pins and a fastening web connecting the parallel fastening pins; and
   a sleeve,
   wherein the sleeve is slidable into an elongated hole of an ophthalmic lens and one end of the structural part is slidable into the sleeve such that a latching connection with a press fit is formed,
   wherein on one face, the sleeve comprises a stop head which is greater in dimension than the dimension of the elongated hole and consequently bears against the ophthalmic lens, and
   wherein, on another face situated oppositely to the face of the stop head, the sleeve comprises a bead-like rim that is formed as a result of displacement of material of the sleeve by the fastening web when the structural part is inserted.

2. The ophthalmic lens fastening according to claim 1, wherein the sleeve is slidable into the elongated hole from an outer face of the ophthalmic lens and the structural part is slidable into the sleeve from a face that is located opposite the outer face.

3. The ophthalmic lens fastening according to claim 1, wherein the parallel fastening pins include barb-like bulges.

4. Spectacles having an ophthalmic lens and an ophthalmic lens fastening according to claim 1.

5. A method for fastening a structural part to an ophthalmic lens, said method including the following steps:
   a) sliding a sleeve into an elongated hole of the ophthalmic lens;
   b) forming a bead-like rim on the sleeve by sliding a structural part including parallel fastening pins and a fastening web connecting the parallel fastening pins into the sleeve,
   wherein the sleeve is slid in from an outer face of the ophthalmic lens and the structural part is slid into the sleeve from an oppositely situated face,
   wherein the sleeve comprises a stop head which is greater in dimension than the dimension of the elongated hole on a face of the sleeve, and
   wherein the fastening web displaces material of the sleeve upon insertion of the structural part in such a manner that the bead-like rim is formed on a face of the sleeve oppositely situated from the surface of a stop head.

* * * * *